C. J. HOLUB.
FURNACE STRUCTURE.
APPLICATION FILED JAN. 6, 1919.
1,358,550.
Patented Nov. 9, 1920.
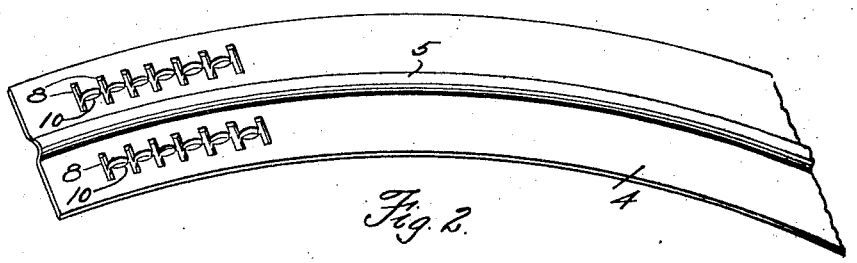
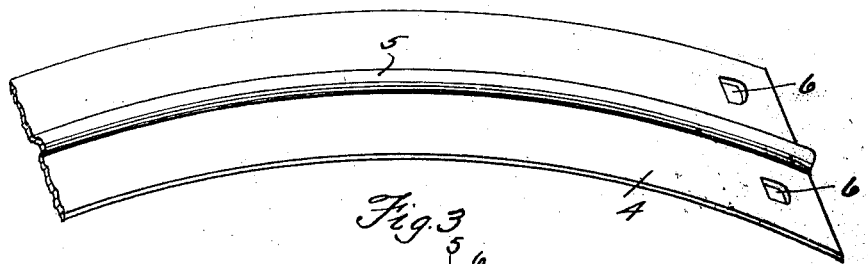
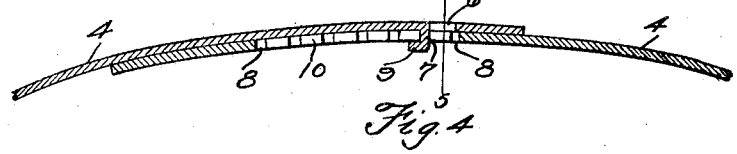
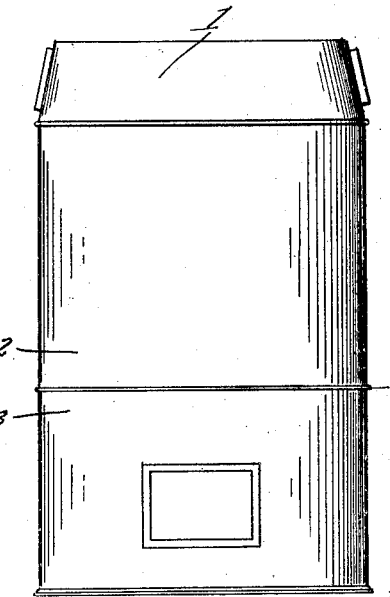
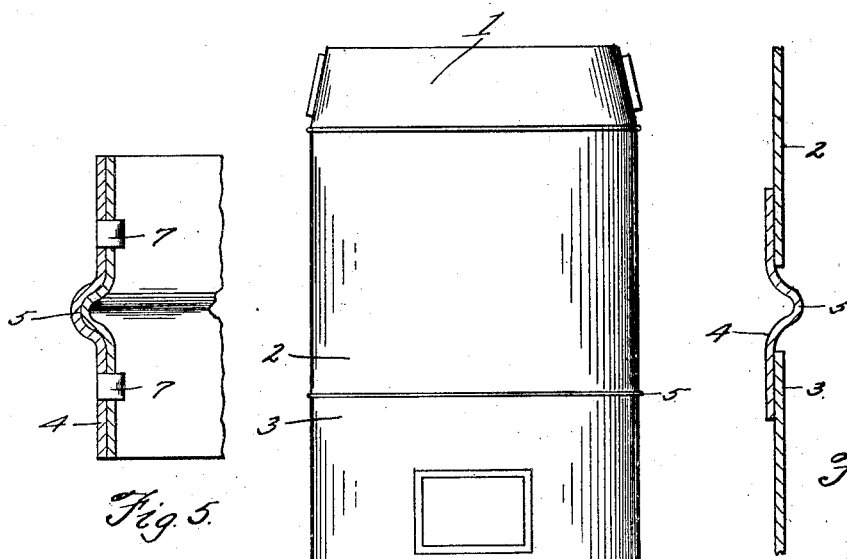
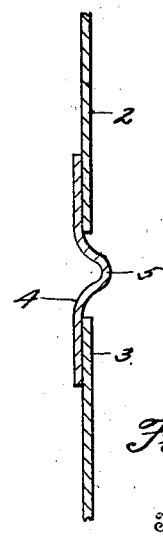
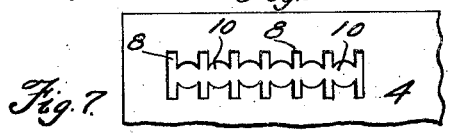
Inventor
Charles J. Holub

UNITED STATES PATENT OFFICE.

CHARLES J. HOLUB, OF COLUMBUS, OHIO, ASSIGNOR TO THE W. E. LAMNECK COMPANY, OF COLUMBUS, OHIO, A CORPORATION OF OHIO.

FURNACE STRUCTURE.

1,358,550.   Specification of Letters Patent.   Patented Nov. 9, 1920.

Application filed January 6, 1919. Serial No. 269,787.

*To all whom it may concern:*

Be it known that I, CHARLES J. HOLUB, a citizen of the United States, residing at Columbus, in the county of Franklin and State of Ohio, have invented certain new and useful Improvements in Furnace Structures, of which the following is a specification.

This invention relates to furnace structures and is particularly directed to an improved type of joining ring used in the manufacture of furnace casings and parts.

These furnace casings and other parts frequently vary in size to a small degree and consequently it has been found necessary to make special joining rings for each casing job. In order to overcome this, I have provided a ring whose ends are designed to overlap and which itself may be made of a plurality of sections. The ends of the ring are provided with adjustable connecting means, forming the essence of this invention, which may be used either for connecting the ends by suitable rivets or bolts or these ends may be connected by means of a tongue struck from one end of the ring and formed to selectively engage with any one of a series of openings formed in the other end, whereby circumferential adjustment of the connecting structure is effected.

The preferred embodiment of my invention is shown in the accompanying sheet of drawings in which similar characters of reference designate corresponding parts and in which, Figure 1 represents a furnace casing showing the manner in which the joining rings are brought into use, Fig. 2 is a view in perspective of one end of the joining ring, Fig. 3 is a view in perspective of the opposite end of the joining ring, Fig. 4 is a longitudinal section taken through the overlapping ends of the ring showing one manner in which they may be connected, Fig. 5 is a cross-section taken on line 5—5 of Fig. 4, Fig. 6 is an enlarged cross-section showing the manner in which the casing parts are associated with the joining ring, and Fig. 7 is an enlarged fragmentary view showing the specific type of punchings employed in one end of the joining ring.

In Fig. 1, the furnace casing has been designated generally by the reference numeral 1 and as shown, the sections 2 and 3 are joined by means of the joining ring shown at 4. This latter is made from one piece of material but may be formed of a plurality of arcuate sections to enable the various sections to be easily nested for shipment. The ring itself is provided with a central longitudinal bead 5 against which the edges of the casing parts 2 and 3 are designed to rest to prevent their movement toward each other. The structure thus far described is one generally in use and no particular claim is made to this.

However, the novelty of my invention resides in the manner in which the ring is rendered adjustable as to size to compensate for any slight inaccuracies regarding the diameter of the casing. It will be understood that a small fraction of an inch variation in the diameter of the casing causes a perceptible variation circumferentially and it is this adjustment that is effected by the present invention. In Fig. 3 one end of the ring is shown as being provided with a pair of openings 6 and by an inspection of Fig. 4, it will be apparent that these openings are formed by striking out the tongues shown at 7. These tongues are designed to fit any of the slotted openings 8 located on the opposite end of the ring. By means of these spaced slotted openings 8, the desired adjustment as to size may be effected and by bending the ends of the tongues over as shown at 9, the ring ends may be securely united. However, it is often desired to unite these ends by means of rivets or bolts and to permit of this, a plurality of circular apertures 10 are shown as being located between the various slotted openings and these apertures are also of a size and so located to register with the openings 6 as clearly shown in Fig. 4. An additional desirable feature incident to so locating the apertures 10 so that they communicate with the slotted openings 8 located on opposite sides of them is that a greatly reduced amount of material is sheared during the punching operation than would be the case should these apertures not be in communication with the slotted openings.

From the foregoing description, taken in connection with the accompanying sheet of drawings, it will be apparent that I have provided a type of joining ring which may ever readily be adjusted to size to compensate for the slight inaccuracies in diameters of the casing parts encountered in actual practice. Likewise, the ring ends may be locked together either by bending the tongues 7 over into locking relation as shown at 9 or, because of the disposition of the registering openings 6 and 10, either bolts or rivets may be used and both types of securing means that is, the bent tongue or the bolts or rivets may be used if such fastening should be desired.

What I claim is:

1. In a furnace structure, a joining ring comprising a flexible band, one end of which has a tongue struck outwardly therefrom, the opposite end being provided with a plurality of spaced slotted openings designed to fit said tongue and being also provided with a plurality of apertures, any one of which will register with the opening formed by said struck-out tongue, said apertures being located between said slots.

2. In a furnace structure, a joining ring comprising a resilient band, one end of which has a tongue struck outwardly therefrom, the opposite end being provided with a plurality of spaced slotted openings designed to fit said tongue, said slotted openings being also connected by apertures located between slots, any one of said apertures being designed to register with the opening formed by said struck-out tongue.

In testimony whereof I affix my signature.

CHARLES J. HOLUB.